(12) United States Patent
Osterhout et al.

(10) Patent No.: US 8,297,676 B2
(45) Date of Patent: Oct. 30, 2012

(54) VEHICLE INTERIOR TRIM PANEL

(75) Inventors: Neal Osterhout, Sterling Heights, MI (US); Yimin She, Framington Hills, MI (US); Prasath Balakrishnan, Novi, MI (US); Jorge Adolfo Miranda Nieto, Guanajuato (MX)

(73) Assignee: Nissan North America, Inc., Franklin, TN (US)

( * ) Notice: Subject to any disclaimer, the term of this patent is extended or adjusted under 35 U.S.C. 154(b) by 20 days.

(21) Appl. No.: 12/945,383

(22) Filed: Nov. 12, 2010

(65) Prior Publication Data

US 2012/0119531 A1     May 17, 2012

(51) Int. Cl.
*B60R 13/02* (2006.01)
*B60R 21/215* (2011.01)

(52) U.S. Cl. ............... 296/1.08; 296/193.06; 280/728.2; 280/728.3

(58) Field of Classification Search ................. 296/1.08, 296/193.06, 191, 39.1, 70, 187.05; 280/730.2, 280/728.2, 728.3; 264/27.1
See application file for complete search history.

(56) References Cited

U.S. PATENT DOCUMENTS

| | | | |
|---|---|---|---|
| 6,328,333 B1 | 12/2001 | Patel et al. | |
| 6,485,049 B1 * | 11/2002 | Prottengeier et al. | 280/730.2 |
| 6,672,027 B2 * | 1/2004 | Mizutani et al. | 52/716.5 |
| 6,808,198 B2 | 10/2004 | Schneider et al. | |
| 6,863,300 B2 * | 3/2005 | Ryu | 280/730.2 |
| 6,883,828 B2 * | 4/2005 | Ohki | 280/730.2 |
| 7,014,208 B2 * | 3/2006 | DePue et al. | 280/728.3 |
| 7,445,233 B2 | 11/2008 | McKimson | |
| 7,578,521 B2 | 8/2009 | Downey et al. | |
| 7,581,749 B2 | 9/2009 | Robins | |
| 7,607,684 B2 | 10/2009 | Downey et al. | |
| 7,690,676 B2 | 4/2010 | Jaramillo et al. | |
| 7,766,370 B2 | 8/2010 | Putcha | |
| 7,766,377 B2 | 8/2010 | Downey et al. | |
| 7,784,818 B2 | 8/2010 | Downey et al. | |
| 7,793,972 B2 | 9/2010 | Downey | |
| 2008/0001384 A1 * | 1/2008 | Catron et al. | 280/730.2 |
| 2009/0091103 A1 | 4/2009 | Zucal et al. | |

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle interior trim panel is provided with a main trim body and a tab extending from the bottom end of the main trim body. The main trim body is configured to releasably cover at least a portion of a pillar of a vehicle, and includes a pillar facing surface, a passenger compartment facing surface, a top end and a bottom end. The tab extends from the bottom end of the main trim body to a free end that is configured to be received in a vehicle component. The tab includes a first face, a second face and a peripheral edge surrounding the first and second faces, and further includes a retention member protruding from the first face of the tab, with the retention member being configured to retain the tab to the vehicle component while the main trim body is released from the pillar.

21 Claims, 8 Drawing Sheets

US 8,297,676 B2

VEHICLE INTERIOR TRIM PANEL

BACKGROUND

1. Field of the Invention

The present invention generally relates to a vehicle interior trim panel of a vehicle body structure. More specifically, the present invention relates to a vehicle interior trim panel that is configured to be at least initially retained to a vehicle component when the vehicle interior trim panel releases from the vehicle pillar.

2. Background Information

The interior of the vehicle typically includes various vehicle interior trim panels that cover the vehicle body as well as other vehicle components disposed inside of the passenger cabin. These interior trim panels are often provided over the metal structural elements of the vehicle body to provide an attractive appearance. These interior trim panels sometimes include, for example, tabs that engage openings in other components to aid in securing the trim panel in a correct orientation over the vehicle body and/or the vehicle components disposed inside of the passenger cabin. Most vehicles now include one or more airbags that are installed under vehicle interior trim panels. Typically, an airbag includes inflatable member that when deployed creates a cushioning bag or cushioning curtain to protect a passenger or passengers during impact events. Airbags are sometimes installed in pillar structures within certain vehicles. For example, an airbag is sometimes installed in an A-pillar of the vehicle such that when the airbag inflates, a cushioning curtain is formed between the vehicle passenger and a door and/or a portion of an interior roof of the vehicle.

In addition, for vehicle A-pillars, the Side Impact New Car Assessment Program (SINCAP) standard now requires a curtain airbag on new vehicles to extend down a portion of the A-pillar. When an airbag is installed beneath a trim panel, the trim panel needs to easily release from the metal structural element of the vehicle body upon deployment of the airbag. Certain modifications have been made to the A-pillar trim panel to accommodate this extension of the airbag and to keep the trim panel from completely separating from the A-pillar upon deployment of the airbag. A common modification is the addition of a two-stage trim clip that remains clipped to the pillar while tethering the trim panel to the pillar, thus allowing the curtain airbag to deploy between the pillar and the trim panel. However, the two-stage trim clip is generally unable to maintain proper positioning of the trim panel.

SUMMARY

In view of the state of the known technology, one aspect of the present invention is directed to various features of a vehicle interior trim panel that releasably secures to a vehicle pillar and at least initially remains coupled to a vehicle component when the vehicle interior trim panel releases from the vehicle pillar. This vehicle interior trim panel is especially useful for a pillar with an airbag at least partially disposed beneath the vehicle interior trim panel so that the vehicle interior trim panel releases from the vehicle pillar upon deployment of the airbag but remains partially attached to a vehicle component.

In order to carry out this aspect of the present invention, a vehicle interior trim panel is provided that mainly comprises a main trim body and a tab extending from the bottom end of the main trim body. The main trim body is configured to releasably cover at least a portion of a pillar of a vehicle, and includes a pillar facing surface, a passenger compartment facing surface, a top end and a bottom end. The tab extends from the bottom end of the main trim body to a free end that is configured to be received in a vehicle component. The tab includes a first face, a second face and a peripheral edge surrounding the first and second faces, and further includes a retention member protruding from the first face of the tab, with the retention member being configured to retain the tab to the vehicle component while the main trim body is released from the pillar.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
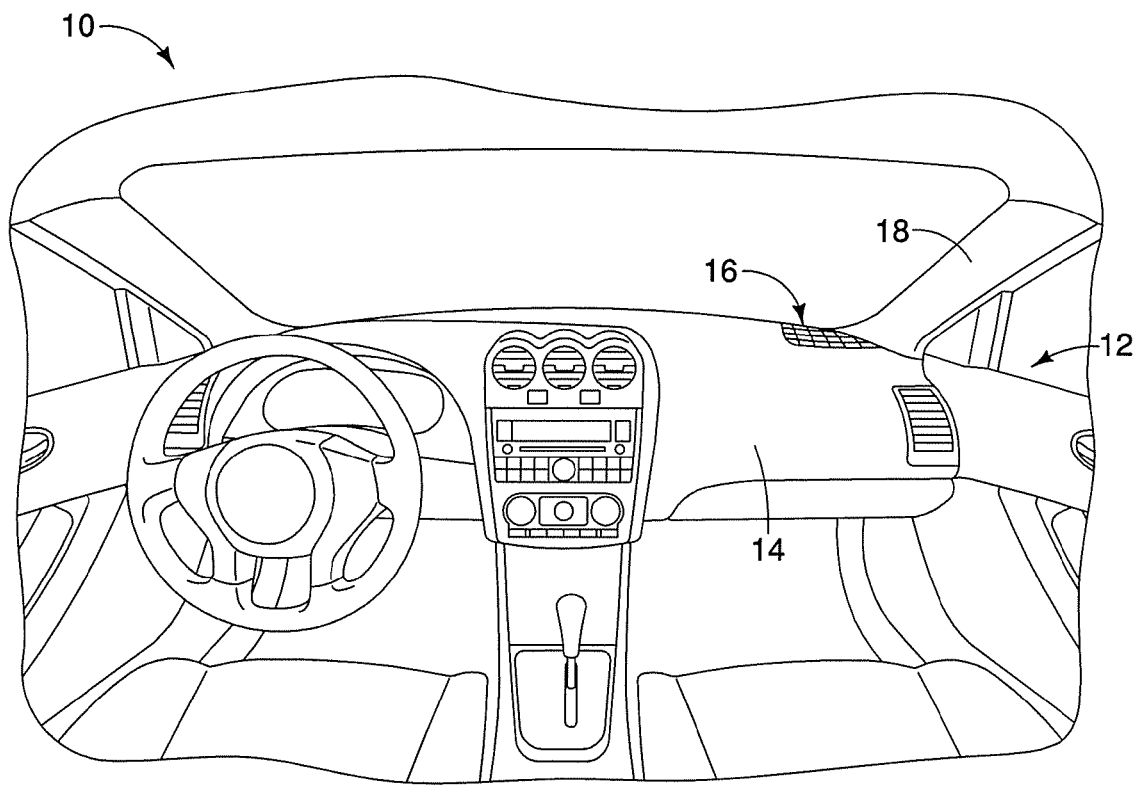
FIG. 1 is a perspective view of an interior portion of a vehicle that has a vehicle body structure with a vehicle interior trim panel releasably secured to a vehicle pillar in accordance with an illustrated embodiment.
Figure 2:
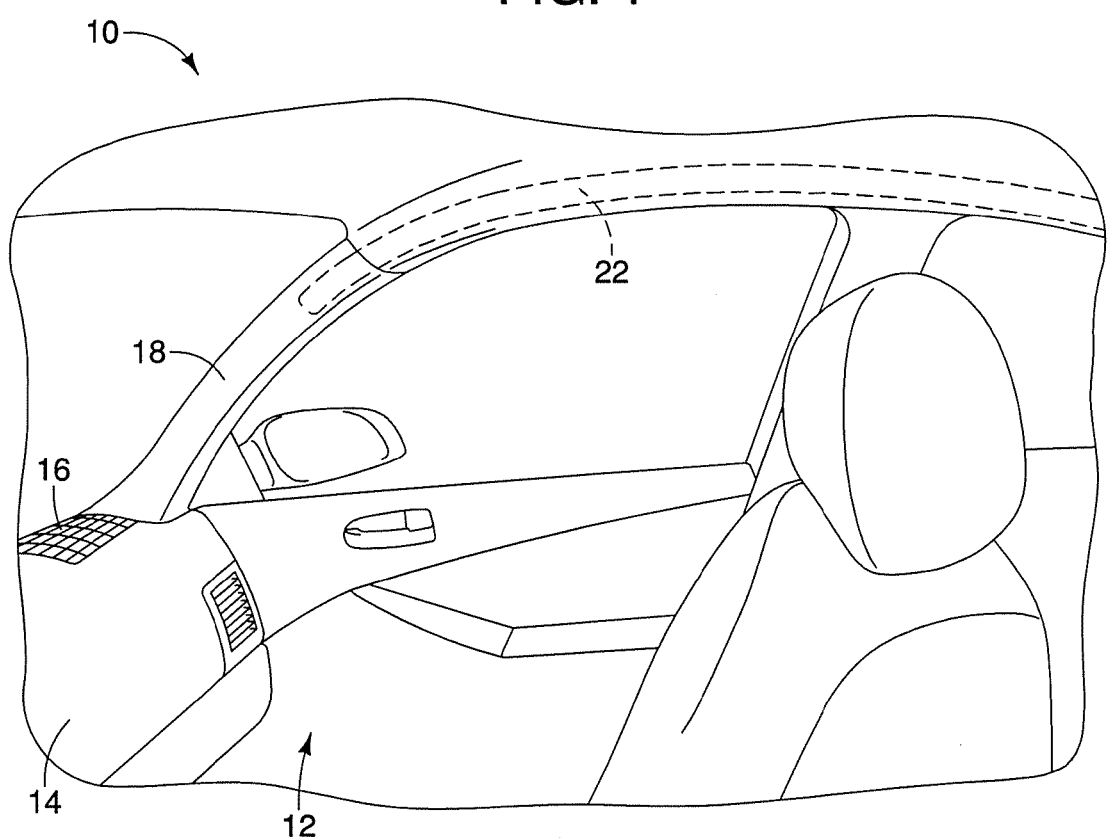
FIG. 2 is another perspective view of the interior portion of the vehicle shown in FIG. 1.
Figure 3:
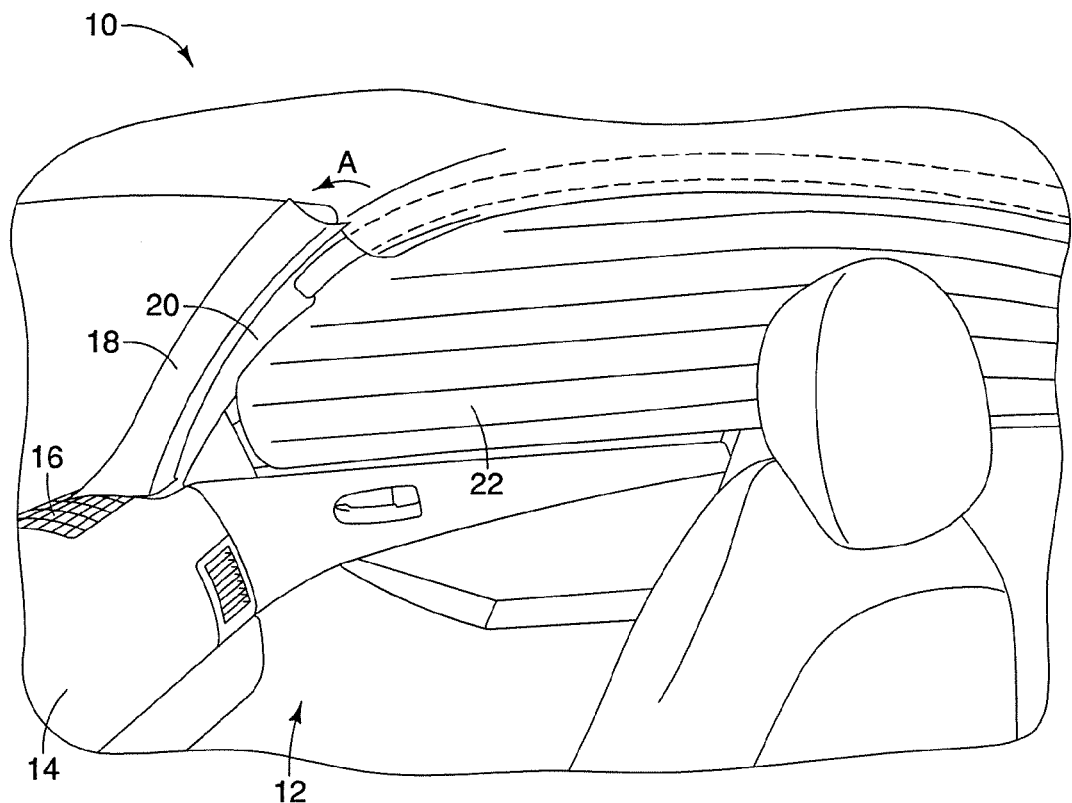
FIG. 3 is a perspective view of the interior portion of the vehicle illustrated in FIG. 1 with the airbag deployed and the vehicle interior trim panel in a detached position with respect to the A-pillar.
Figure 4:
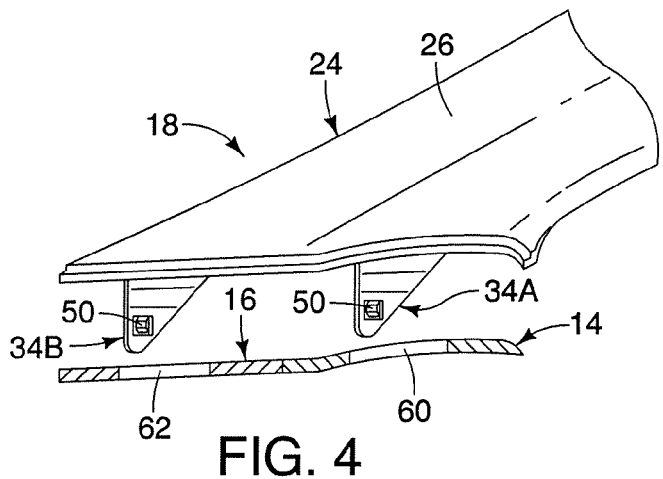
FIG. 4 is an enlarged interior side elevational view of the bottom end of the vehicle interior trim panel that includes tabs prior to insertion of the tabs into the vehicle component.
Figure 5:
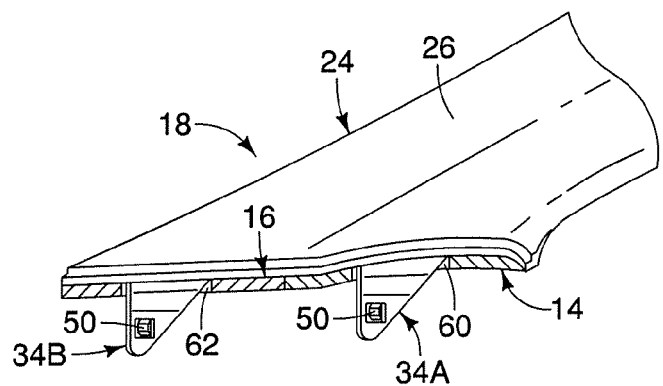
FIG. 5 is an enlarged interior side elevational view of the bottom end of the vehicle interior trim panel as shown in FIG. 4 after insertion of the tabs into the vehicle component.
Figure 6:
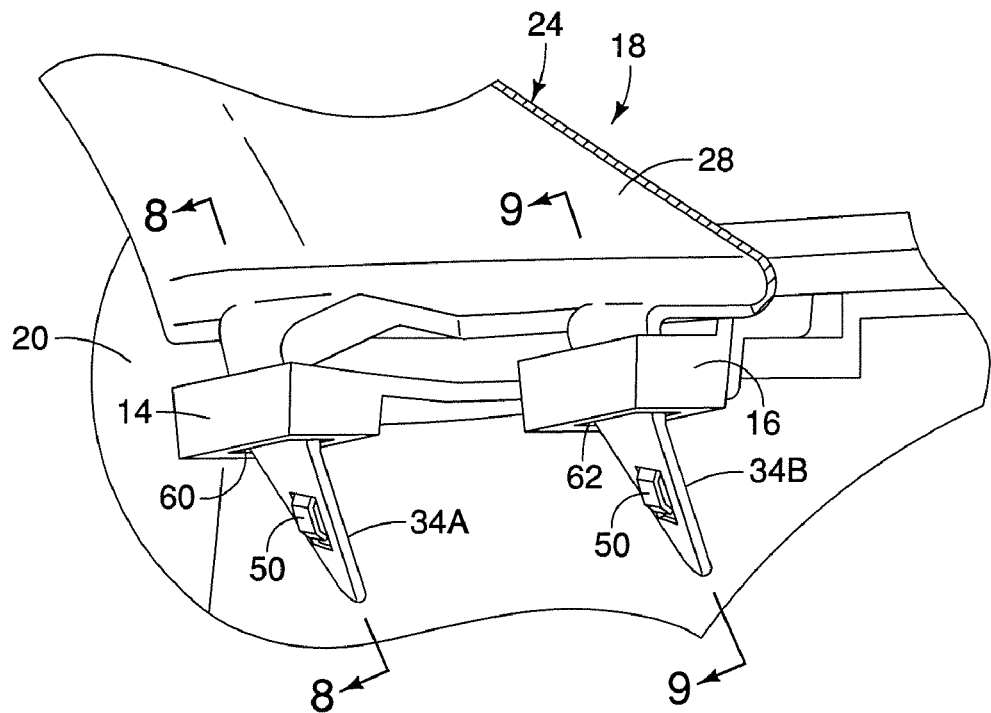
FIG. 6 is a perspective view of the bottom end of the vehicle interior trim panel connected to the vehicle component as seen from the underside of the vehicle component that shows the tabs of the vehicle interior trim panel inserted in the vehicle component when the vehicle interior trim panel is releasably secured to the vehicle pillar as shown in FIG. 1.

Referring initially to FIGS. 1 through 3, an interior portion of a vehicle 10 includes a vehicle body 12 that defines a passenger compartment. The vehicle body 12 has a dash board 14 (or instrument panel) and a pair of speaker grilles 16 (only the passenger's side is shown) disposed within the passenger compartment of the vehicle body 12. In this example, a pair of vehicle interior trim panels 18 in accordance with an illustrated embodiment are releasably secured to pillars 20 of the vehicle body 12 with bottom ends of the vehicle interior trim panels 18 being flushly disposed with portions of the dash board 14 and the speaker grilles 16. The vehicle interior trim panel 18 on the driver's side is a mirror image of the vehicle interior trim panel 18 on the passenger's side. Thus, the vehicle interior trim panel 18 on the driver's side is configured and arranged to cooperate with the driver's end of the dash board 14, the driver's side speaker grilles 16 and the driver's side pillar 20 in the same manner as the vehicle interior trim panel 18 on the passenger's side, which is discussed below in more detail. Thus, the following description of the vehicle interior trim panel 18 for passenger's side pillar 20 also applies to the vehicle interior trim panel 18 for the driver's side pillar 20.

The trim panel 18 can be made of plastic, composite or any suitable material as known in the art. An airbag 22 is disposed between the trim panel 18 and the pillar 20. The trim panel 18 is configured to overlay a portion of the pillar 20 and conceal the airbag 22. As shown in FIGS. 1 through 3, the pillar 20 is an A-pillar of the vehicle 10. Of course, the vehicle interior trim panel 18 can be employed in other areas of the vehicle 10. The trim panel 18 is releasably secured to the pillar 20 such that the trim panel 18 moves away from the pillar 20 in response to deployment of the concealed airbag 22.

As further shown in FIG. 3, the trim panel 18 is also configured to at least partially breakaway from the pillar 20 in response to deployment (inflation) of the airbag 22. In particular, the trim panel 18 moves away from the pillar 20 in a direction indicated by arrow A by a sufficient distance away from the pillar 20 to allow full deployment of the airbag 22.

Further details of the trim panel 18 are shown in FIGS. 3-15. As illustrated, the trim panel 18 includes a main trim body 24 having a passenger compartment facing surface 26 and a pillar facing surface 28. The passenger compartment facing surface 26 constitutes an exposed surface in that the passenger compartment facing surface 26 is visible from within the passenger compartment while the trim panel 18 is in its installed position. The pillar facing surface 28 constitutes a concealed surface in that the pillar facing surface 28 is not visible from within the passenger compartment while the trim panel 18 is in its installed position.

The main trim body 24 further includes a top edge 30 at the top end of the main trim body 24, a bottom edge 31 at the bottom end of the main trim body 24, a front peripheral edge 32 and a rear peripheral edge 33. In this example, two tabs 34A and 34B extend from the bottom end of the trim panel 18. In particular, the tabs 34A and 34B extend from the bottom edge 32 of the trim panel 18 to a free end that is configured to be received in a vehicle component. Thus, in this example, the first tab 34A and second tab 34B are spaced apart along the bottom edge 32 of the bottom end of the main trim body 24, and the first tab 34A is located closer to a rear peripheral edge 33 of the main trim body 24 than the second tab 34B.

In the illustrated embodiment, the tabs 34A and 34B are disposed in the dash board 14 and the speaker grille 16. However, the tabs 34A and 34B can be disposed in any suitable component as needed and/or desired in view of the vehicle configuration. Although this example illustrates two of the tabs 34A and 34B, the trim panel 18 can include a single tab 34A or 34B, or any suitable number of tabs 34A and 34B as needed and/or desired. The tabs 34A and 34B can be formed integrally with the main trim body 24 as a one-piece, unitary member such that the tabs 34A and 34B include the same material as the main trim body 24 as illustrated. Alternatively, the tabs 34A and 34B can be formed of the same material as the main trim body 24 or a different material, and secured to the main trim body 24 in any suitable manner, such as by snap-fitting, adhesive, one or more fasteners and so on.

In this example, each of the tabs 34A and 34B includes a first surface 36, a second surface 38 and a peripheral edge 40. The first surfaces 36 can be referred to as a first face of the tabs 34A and 34B, while the second surfaces 38 can be referred to as a second face of the tabs 34A and 34B. The peripheral edges 40 surrounds the first and second surfaces 36 and 38 (first and second faces), respectively, and define the outer peripheries of the tabs 34A and 34B. In this example, the first surfaces 36 are located on the same sides of the tabs 34A and 34B as the pillar facing surface 28.

The peripheral edge 40 of each of the tabs 34A and 34B includes a first side edge 42, a second side edge 44 and a bottom edge 46 as illustrated. Each of the tabs 34A and 34B further includes an opening or aperture 48 therein, that extends from the first surface 36 to the second surface 38. A retention member 50 flexibly extends into the aperture 48 and is deflectable into and out of the aperture 48 in directions transverse to the first and second surfaces 36 and 38. Thus, the retention members 50 protrude from the first surfaces 36 of the tabs 34A and 34B. Accordingly, each of the tabs 34A and 34B includes a first portion (e.g., the portions of the tabs 34A and 34B that define the apertures 48) and a second portion that is deflectably configured with respect to the first portion and includes the retention member 50. In other words, the first portion defines the aperture 48, and the second portion is deflectably configured with respect to the first portion to deflect within the aperture 48. Also, instead of defining the aperture 48, each of the tabs 34A and 34B can define a recess between the first surface 36 of the tabs 34A and 34B and the retention member 50 such that at least a portion of the retention member 50 is deflectably arranged with respect to the first surface 36 of the tabs 34A and 34B.

As will now be discussed, the retention member 50 is configured to retain the tabs 34A and 34B to the vehicle component (e.g., the dash board 14 or the speaker grille 16) while the main trim body 24 is released from the pillar 20. In this example which includes two tabs 34A and 34B, one of the tabs 34A can be referred to simply as a tab 34A or a first tab 34A, and the other tab 34B can be referred to as an additional or second tab 34B. The first and second tabs 34A and 34B are spaced apart along the bottom end of the main trim body 24, with the first tab 34A being located closer to a rear peripheral edge 33 of the main trim body 24 than the second tab 34B as shown. It should also be noted that the retention member 50 of the first tab 34A can be larger in size than the retention member 50 of the second tab 34B, or vice-versa.

Each of the retention members 50 of the tabs 34A and 34B includes an upper ramp surface 52, a guide surface 54 and a lower ramp surface 56. In this example, the upper ramp surface 52 couples the retention member 50 to the tabs 34A and 34B in a cantilevered manner with the lower ramp surface 56 extending to a free end of the retention member 50. The upper ramp surfaces 52 extend angularly with respect to the first surfaces 36 of the tabs 34A and 34B such that the guide surfaces 54 extend outwardly beyond the first surfaces 36 of the tabs 34A and 34B. The guide surfaces 54 extend laterally, parallel or substantially parallel with respect to the first surfaces 36. Also in this example, the upper ramp surfaces 52 act as a retention surface that faces in a direction generally towards the top end of the main trim body 24.

Although each of the tabs 34A and 34B in this example includes the features discussed above, one or more tabs 34A and 34B may not include an aperture 48 and retention member 50. Moreover, one or more tabs 34A and 34B can include a plurality of apertures 48 or recesses and a plurality of retention members 48. Also, several retention members 50 can extend into one aperture 48 or recess. Furthermore, in this example, the retention member 50 is made of the same material as the tabs 34A and 34B and formed integrally with the tab 34A and 34B. However, a retention member 50 can be formed of the same material as the tab 34A and 34B or a different material, and secured to the tab 34A and 34B in any suitable manner, such as by snap-fitting, adhesive, one or more fasteners and so on.

Figure 11:
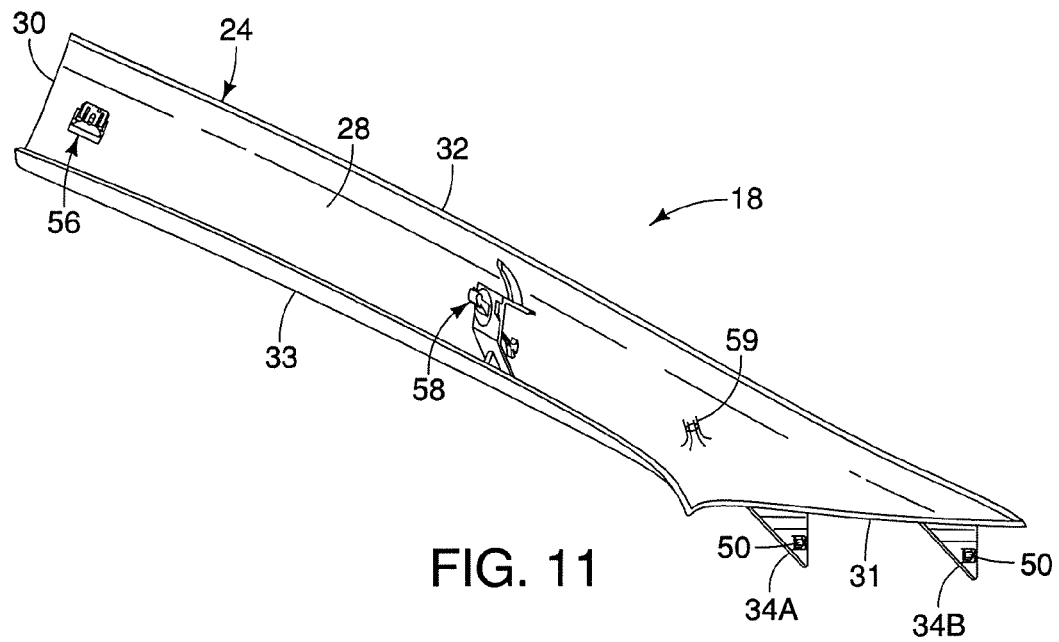
FIG. 11 is a concealed side elevational view of the vehicle interior trim panel showing the pillar facing surface.
Figure 12:
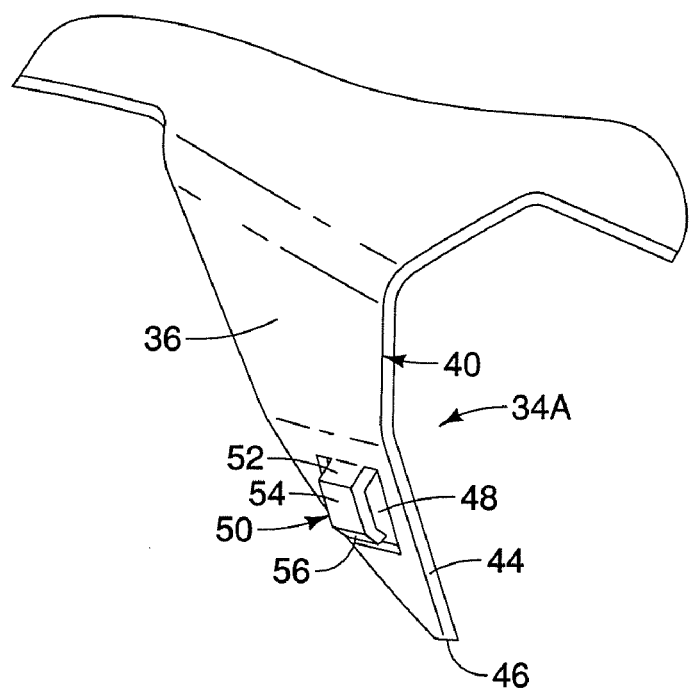
FIG. 12 is an enlarged perspective view of one of the tabs and retention members of the vehicle interior trim panel as viewed from the pillar facing surface of the vehicle interior trim panel.
Figure 13:
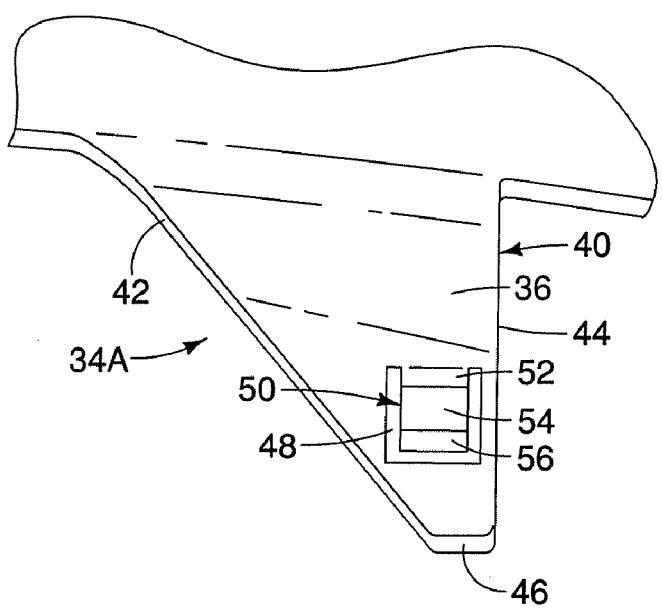
FIG. 13 is an enlarged pillar facing side view of one of the tabs and retention members of the vehicle interior trim panel as viewed from the pillar facing surface of the vehicle interior trim panel.
Figure 14:
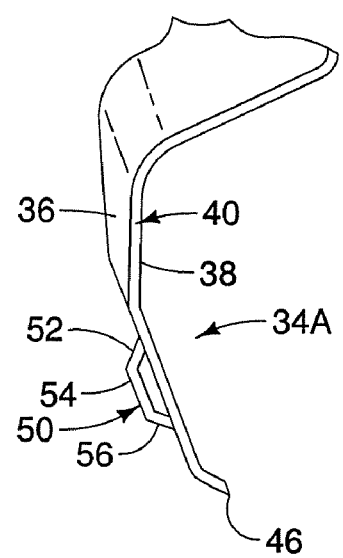
FIG. 14 is an enlarged side view of one of the tabs and retention members of the vehicle interior trim panel as viewed from the right side in FIG. 13.
Figure 15:
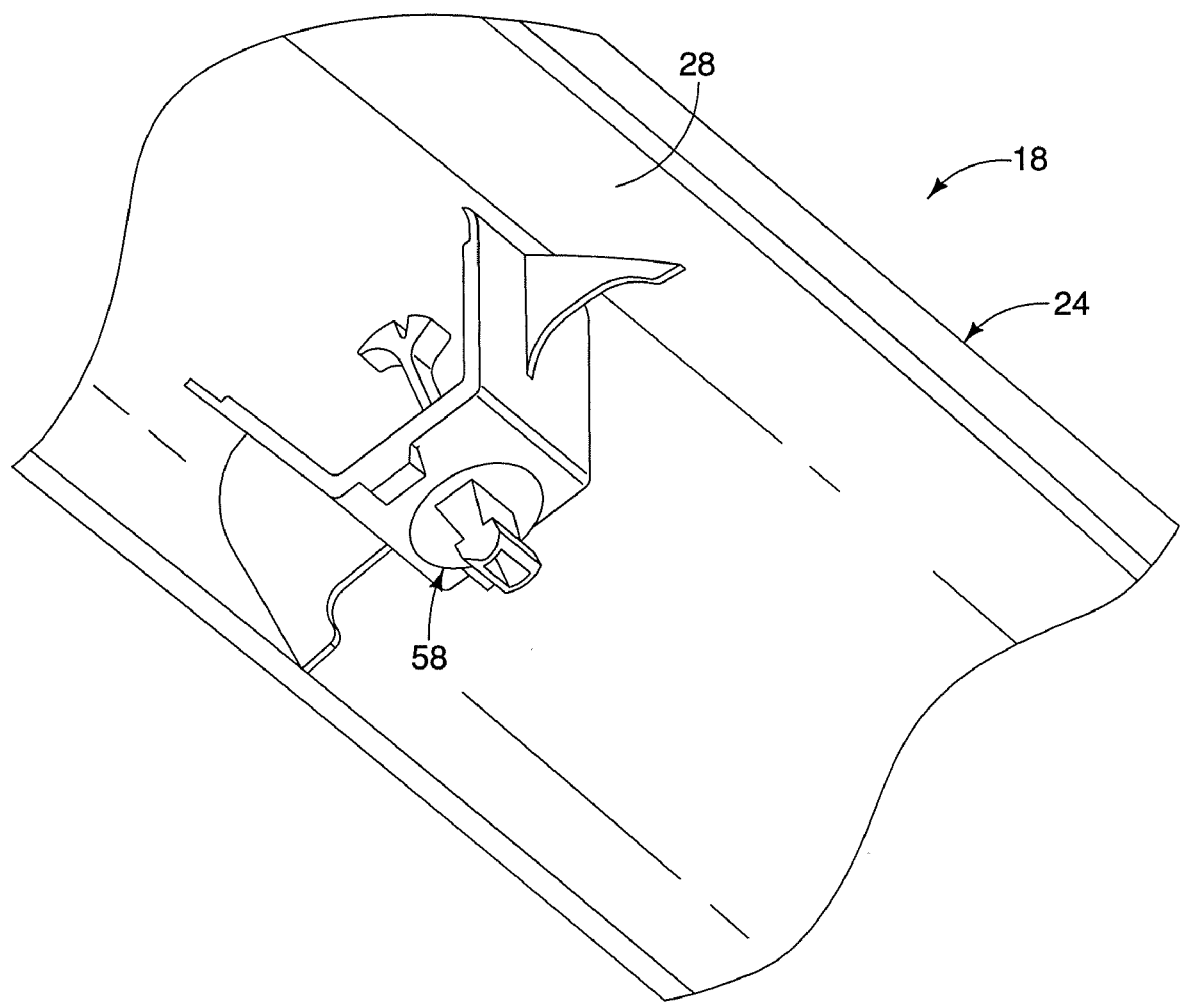
FIG. 15 is an enlarged perspective view of a portion of the vehicle interior trim panel that includes the integrated trim clip and tether for connecting the vehicle interior trim panel to the vehicle pillar.

As further shown in FIGS. 11 and 15, the trim panel 18 also includes a one-stage clip structure 56, a two-stage clip structure 58, and one or more locating structures 59 disposed on the pillar facing surface 28 of the main trim body 24. However, the trim panel 18 can be constructed with no locating structures 59, or only one or the other of the clip structures 56 and 58, as well as various combinations of several clip structures 56 and 58 and locating structures 59, as needed and/or desired. In this example, the pillar facing surface 28 of the main trim body 24 includes at least a one-stage fastening clip 56 located proximate to the top end of the main trim body 24, a two-stage fastening clip 58 located between the one-stage fastening clip and the bottom end of the main trim body 24, and a locating structure 59 located between the two-stage fastening clip 58 and the bottom end of the main trim body 24 The locating structure 59 assists in positioning the trim panel 18 to the pillar 20, and the one-stage clip structure 56 and the two-stage clip structure 58 releasably and retainably secure the trim panel 18 to the pillar 20 in a conventional manner as understood in the automotive field.

That is, during installation of the trim panel 18 over the pillar 20, the tabs 34A and 34B pass through apertures in the dash board 14 and the speaker grille 16. In this example, as shown in FIGS. 4-9, one of the tabs 34A passes through an aperture 60 in the dash board 14 and the other tab 34B passes through an aperture 62 in the speaker grille 16. Naturally, the apertures 60 and 62 need not be provided in the speaker grille 16 and dash board 14, respectively, but rather, both apertures 60 and 62 can be provided in the dash board 14, in the speaker grille 16 or in any other suitable component of the vehicle 10. Furthermore, different numbers of apertures can be present to accommodate different numbers of tabs 34A and 34B.

As the tabs 34A and 34B are being inserted into the respective apertures 60 and 62, at least the lower ramp surface 56 and guide surface 54 of the retention members 50 guide the tabs 34A and 34B into the respective apertures 60 and 62 and thus facilitate installation of the tabs 34A and 34B into the respective apertures 60 and 62. As can be understood in the art, the retention members 50 flex inwardly of their respective apertures 48 in their respective tabs 34A and 34B as the retention members 50 contact the respective edges 64 and 66 of the dash board 14 and speaker grille 16 while the tabs 34A and 34B are being inserted into the respective apertures 60 and 62. Once the guide surfaces 54 of the retention members 50 pass beyond the respective edges 64 and 66, the retention members 50 flex back to their relaxed position. As a result, the upper ramp surfaces 52 contact the respective concealed surfaces 68 and 70 of the dash board 14 and the speaker grille 16, thus providing a snap-fit connection between the tabs 34A and 34B, the dash board 14 and the speaker grille 16. That is, the tabs 34A and 34B and the retention members 50 are configured with respect to the apertures 60 and 62 such that the tabs 34A and 34B release from the apertures 60 and 62 without deformation therebetween in a first position and is prevented from being withdrawn from the apertures 60 and 62 without deformation therebetween in a second position.

The one-stage clip structure 56 and the two-stage clip structure 58 couple to corresponding structures on, for example, the pillar 20 in a manner as understood in the art. Accordingly, the arrangement of the tabs 34A and 34B, apertures 60 and 62, one-stage clip structure 56 and two-stage clip structure 58 maintain a suitable fit and finish of the trim panel 18 over the pillar 20 and with respect to the exposed surface 72 of the dash board 14 and the exposed surface 74 of the speaker grille 16.

Figure 7:
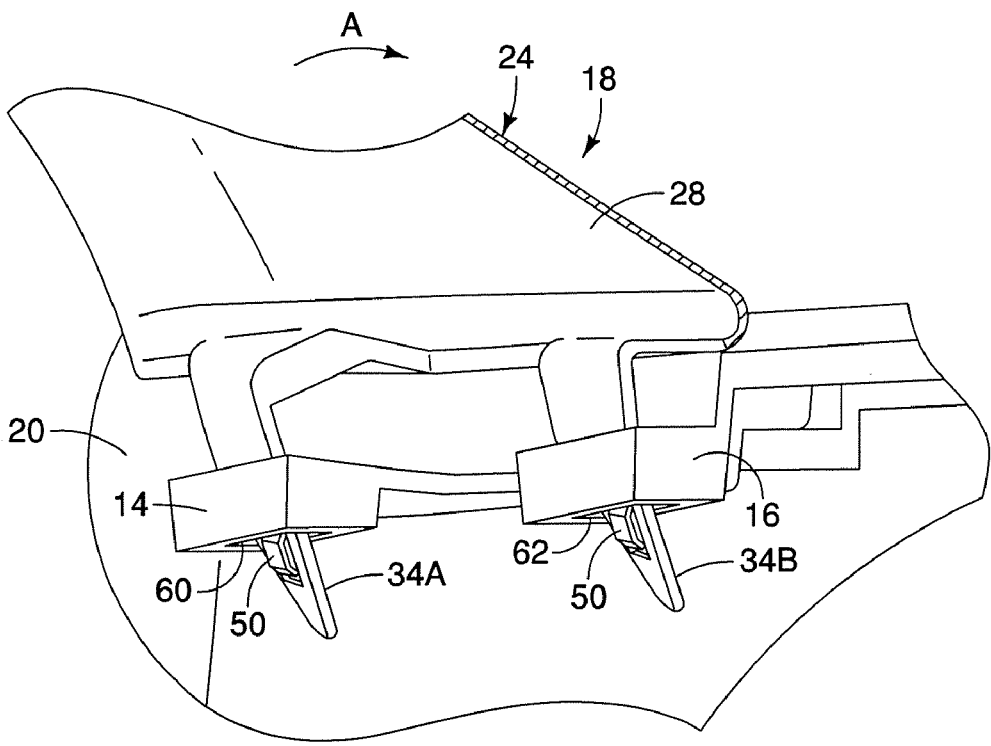
FIG. 7 is a perspective view of the bottom end of the vehicle interior trim panel and connected to the vehicle component as seen from the underside of the vehicle component that shows the retention members of the tabs of the vehicle interior trim panel engaging the vehicle component when the vehicle interior trim panel is released from the vehicle pillar as shown in FIG. 3.
Figure 8:
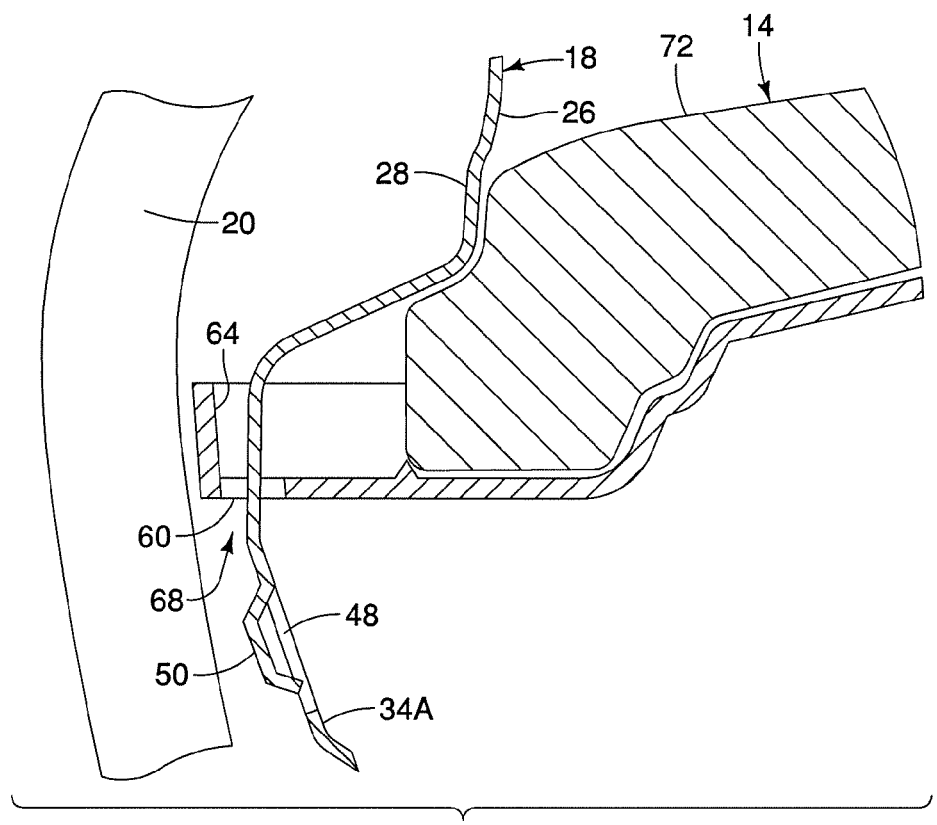
FIG. 8 is a cross sectional view of the bottom end of the vehicle interior trim panel and the vehicle component taken along section lines 8-8 in FIG. 6.
Figure 9:
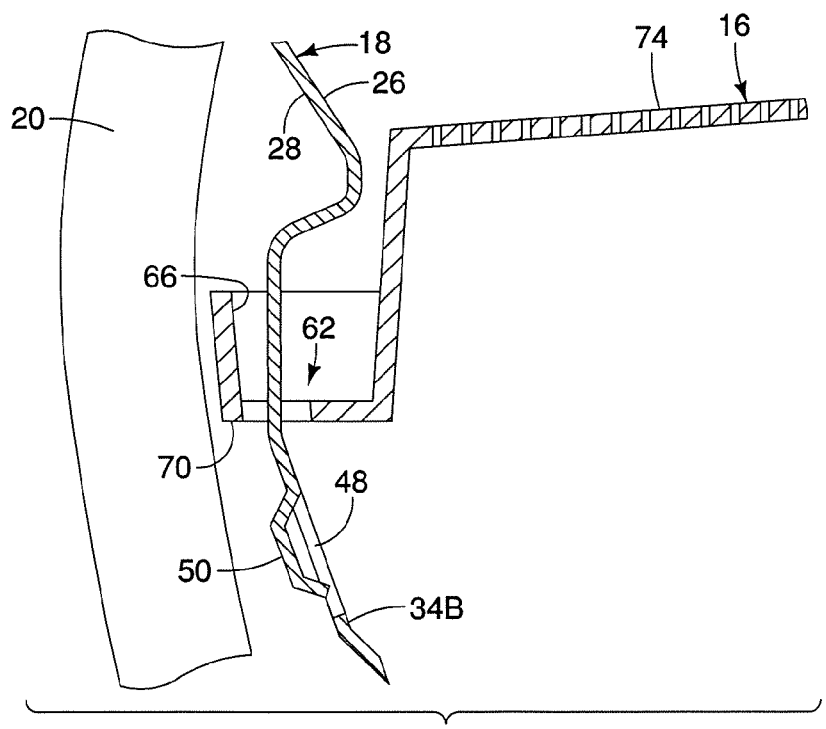
FIG. 9 is a cross sectional view of the bottom end of the vehicle interior trim panel and the vehicle component taken along section lines 9-9 in FIG. 6.
Figure 10:
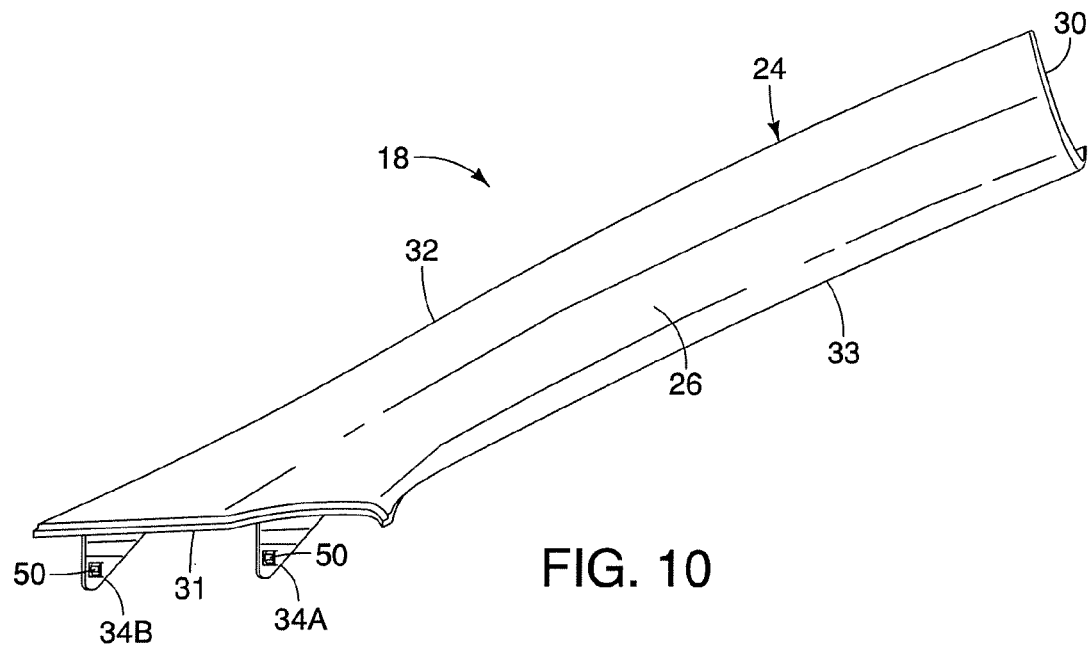
FIG. 10 is an interior side elevational view of the vehicle interior trim panel showing the passenger compartment facing surface.

Furthermore, the upper ramp surfaces 52 of the retention members 50 act as retention surfaces to retain the tabs 34A and 34B in the apertures 60 and 62 when the airbag 22 is deployed. That is, as shown in FIGS. 3 and 7, when the airbag is deployed, the force of the deployment causes the trim panel 18 to release from the pillar 20. As this occurs, the trim panel 18 can move or pivot about the area of engagement of the tabs 34A and 34B and edges 64 and 66 of corresponding apertures 60 and 62. That is, the trim panel 18 is configured to pivot relative to the vehicle component (e.g., the dash board 14, speaker grille 16 or any other suitable component) to allow deployment of the airbag 20. The pivot axis about which the trim panel 18 pivots can be formed by either the second surfaces 38 of the tabs 34A and 34B, the bottom edge 32 of the main trim body 24, or the passenger compartment facing surface 26 of the main trim body 24, contacting the exposed surface of the vehicle component (e.g., the exposed surface 72 of the dash board 14 or the exposed surface 74 of the speaker grille 16) and rotating about that point of contact. This movement or pivoting can cause the tabs 34A and 34B to move in a direction outward of the apertures 60 and 62. However, as shown in FIG. 7, the upper ramp surfaces 52, in particular, of the retention members 50 contact the concealed surfaces 68 and 70 of the dash board 14 and speaker grille 16, respectively, and thus retain the tabs 34A and 34B in the apertures 60 and 62. Thus, the vehicle component (e.g., dash board 14, speaker grille 16 or any other suitable component) includes a concealed surface, and the retention surface of the retention member contacts the concealed surface of the vehicle component to prevent movement of the tabs 34A and 34B out of the apertures 60 and 62. In other words, the trim panel 18 is pivotally arranged relative to the vehicle component by the second surfaces 38 of the tabs 34A and 34B contacting the vehicle component during deployment of the airbag 20. Accordingly, the retention members 50 prevent the tabs 34A and 34B from exiting the apertures 60 and 62 during airbag deployment.

On the other hand, if it is desirable to remove the trim panel 18 from the dash board 14 and speaker grille 16 in this example, a tool can be inserted into apertures 60 and 62 to deflect the retention members 50 into their respective apertures 48 in their respective tabs 34A and 34B and away from the concealed surfaces 68 and 70 of the dash board 14 and the speaker grille 16. In this deflected position, the retention members 50 will no longer secure the tabs 34A and 34B in the apertures 60 and 62 and accordingly, the tabs 34A and 34B will exit the openings when the trim panel 18 is removed from the dash board 14 and the speaker grille 16.

Figure 16:
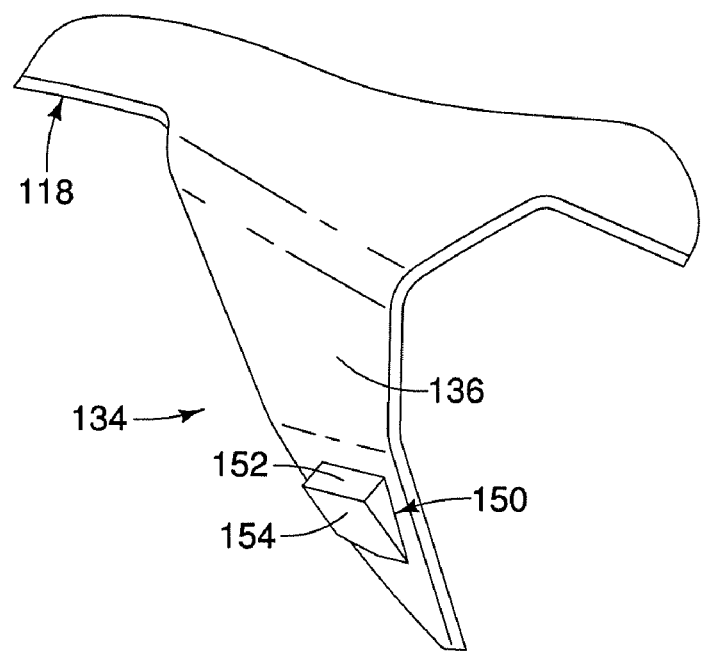
FIG. 16 is an enlarged perspective view of one of the tabs and retention members of the vehicle interior trim panel according to another disclosed embodiment as viewed from the pillar facing surface of the vehicle interior trim panel.
Figure 17:
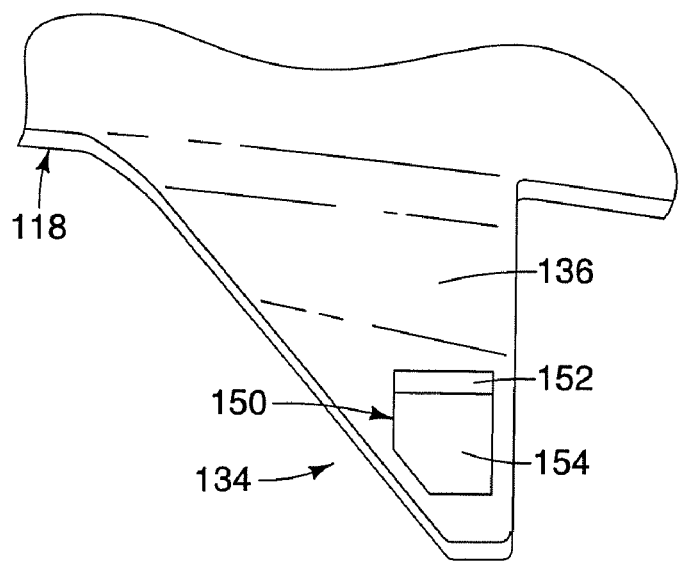
FIG. 17 is an enlarged pillar facing side view of one of the tabs and retention members of the vehicle interior trim panel shown in FIG. 16 as viewed from the pillar facing surface of the vehicle interior trim panel.
Figure 18:
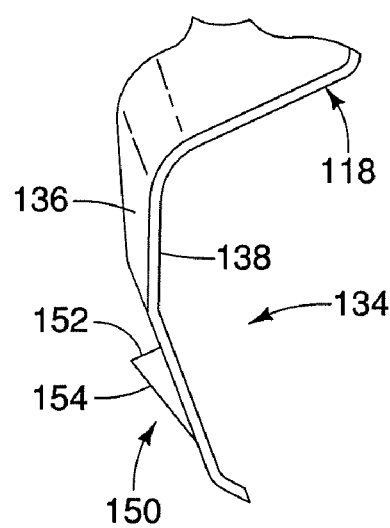
FIG. 18 is an enlarged side view of one of the tabs and retention members of the vehicle interior trim panel as viewed from the right side in FIG. 17.

Referring now FIGS. 16 to 18, a bottom portion of a vehicle interior trim panel 118 is illustrated in accordance with another embodiment. In this example, the vehicle interior trim panel 118 is identical to the vehicle interior trim panel 18 discussed above, except that vehicle interior trim panel 118 has modified tabs 134, and only one of the tabs is illustrated. Thus, the tabs 134 of the trim panel 118 cooperate with the dash board 14 and speaker grille 16 in the same manner as discussed above with respect to the trim panel 18. Also the trim panel 118 is installed on the pillar 20 in the same manner as discussed above with respect to the trim panel 18. Each of the tabs 134 includes a retention member 150. As indicated, the retention member 150 includes an upper surface 152 and a guide surface 154, which can also be referred to as a ramp surface. In this example, the upper surface 152 extends traversely, perpendicularly, or substantially perpendicular with respect to the first surface 136 of the tab 134, and the guide surface 154 extends angularly with respect to the first surface 136 of the tab 134, such that the upper surface 152 and guide surface 154 extend outwardly beyond the first surface 136 of the tab 134. In this example, the upper surface 152 acts as a retention surface that faces in a direction generally towards the top end of the main trim body of trim panel 118. Furthermore, the guide surface 154 (ramp surface) extends from the retention surface (upper surface 152) to the first surfaces 136 such that the ramp surfaces are tapered toward the first surfaces 136 of the tabs 134 as the ramp surfaces approach the free ends of the tabs 134. The ramp surfaces can end at the free ends of the tabs 134, or at locations that are spaced from the free ends of the tabs 134.

The retention members 150 function in a manner similar to that discussed above with regard to the features of the retention members 50. That is, as the tabs 134 are being inserted into the respective apertures 60 and 62, at least the guide surface 154 of the retention members 150 guide the tabs 134 into the respective apertures 60 and 62, and thus, facilitates installation of the tabs 134 into the respective apertures 60 and 62. As can be understood in the automotive field, the tabs 134 flex as the retention members 150 contact the respective edges 64 and 66 of the dash board 14 and the speaker grille 16 while the tabs 134 are being inserted into the respective apertures 60 and 62. Once the guide surfaces 154 of the retention members 150 pass beyond the respective edges 64 and 66, the retention members 150 flex back to their relaxed position. As a result, the upper surfaces 152 contact the respective concealed surfaces 68 and 70 of the dash board 14 and speaker grille 16, thus providing a snap-fit connection between the tabs 134, the dash board 14 and the speaker grille 16.

Furthermore, the upper surfaces 152 of the retention members 150 act as retention surfaces to retain the tabs 134 in the apertures 60 and 62 when the airbag 22 is deployed as discussed above. That is, when the airbag 22 is deployed, the force of the deployment causes the trim panel 118 to release from the pillar 20. As this occurs, the trim panel 118 can move or pivot about the area of engagement of the tabs 134 and apertures 60 and 62. This movement or pivoting can cause the tabs 134 to move in a direction outward of the apertures 60 and 62. However, the upper surfaces 152, in particular, of the retention members 150 contact the concealed surfaces 68 and 70 of the dash board 14 and the speaker grille 16, respectively, and thus retain the tabs 134 in the apertures 60 and 62. Accordingly, the retention members 150 prevent the tabs 134 from exiting the apertures 60 and 62 during airbag deployment. On the other hand, if it is desirable to remove the trim panel 118 from the dash board 14 and the speaker grille 16 in this example, a tool can be inserted into apertures 60 and 62 to deflect the respective tabs 134 away from the concealed surfaces 68 and 70 of the dash board 14 and speaker grille 16. In this deflected position, the retention members 150 will no longer secure the tabs 134 in the apertures 60 and 62 and accordingly, the tabs 134 will exit the openings when the trim panel 118 is removed from the dash board 14 and the speaker grille 16.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle interior trim panel. Accordingly, these terms, as utilized to describe the present invention should be interpreted relative to a vehicle equipped with the vehicle interior trim panel. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments of the present invention are provided for illustration only, and not for the purpose of limiting the invention as defined by the appended claims and their equivalents.

What is claimed is:

1. A vehicle interior pillar trim panel comprising:
   a main trim body configured to releasably cover at least a portion of a pillar of a vehicle, the main trim body including a pillar facing surface, a passenger compartment facing surface, a top end and a bottom end; and
   a tab extending from the bottom end of the main trim body to a free end that is configured to be received in a vehicle component, the tab including a first face, a second face and a peripheral edge surrounding the first and second faces, the tab further including a retention member protruding from the first face of the tab, the retention member being configured to retain the tab to the vehicle component while the main trim body is released from the pillar.

2. The vehicle interior pillar trim panel according to claim 1, wherein
   the retention member includes a retention surface that faces in a direction generally towards the top end of the main trim body.

3. The vehicle interior pillar trim panel according to claim 2, wherein
   the retention member includes a ramp surface extending from the retention surface to the first face such that the ramp surface is tapered toward the first face of the tab as the ramp surface approaches the free end of the tab.

4. The vehicle interior pillar trim panel according to claim 3, wherein
   the ramp surface ends at the free end of the tab.

5. The vehicle interior pillar trim panel according to claim 3, wherein
   the ramp surface ends at a location that is spaced from the free end of the tab.

6. The vehicle interior pillar trim panel according to claim 1, further comprising
   at least one additional tab extending from the bottom end of the main trim body and including a retention member.

7. The vehicle interior pillar trim panel according to claim 6, wherein
   the tabs include a first tab and a second tab, with the retention member of the first tab being larger in size than the retention member of the second tab.

8. The vehicle interior pillar trim panel according to claim 6, wherein
   the tabs include a first tab and a second tab, with the first and second tabs spaced apart along the bottom end of the main trim body and the first tab being located closer to a rear peripheral edge of the main trim body than the second tab.

9. The vehicle interior pillar trim panel according to claim 1, wherein
   the first face is located on the same side of the tab as the pillar facing surface.

10. The vehicle interior pillar trim panel according to claim 1, wherein
    the retention member includes a retention surface that is substantially perpendicular to the first face of the tab.

11. The vehicle interior pillar trim panel according to claim 1, wherein
    the tab includes a first portion and a second portion deflectably configured with respect to the first portion, the second portion including the retention member.

12. The vehicle interior pillar trim panel according to claim 11, wherein
    the first portion defines an aperture, with the second portion being deflectably configured with respect to the first portion to deflect within the aperture.

13. The vehicle interior pillar trim panel according to claim 1, wherein
    the tab defines a recess between the first face of the tab and the retention member such that at least a portion of the retention member is deflectably arranged with respect to the first face of the tab.

14. A vehicle structure comprising:
    a pillar;
    an vehicle component defining an aperture; and
    a vehicle interior pillar trim panel releasably coupled to the pillar, the pillar trim panel including
       a main trim body including a pillar facing surface, a passenger compartment facing surface, a top end and a bottom end, and
       a tab extending from the bottom end of the main trim body to a free end, the tab extending through the aperture of the vehicle component, the tab including a first face, a second face and a peripheral edge surrounding the first and second faces, the tab further including a retention member protruding from the first face of the tab, the retention member selectively retaining the vehicle interior pillar trim panel to the vehicle component while the main trim body is released from the portion of the pillar.

15. The vehicle structure according to claim 14, wherein
    the retention member includes a retention surface that faces in a direction generally towards the top end of the main trim body.

16. The vehicle structure according to claim 15, wherein
    the vehicle component includes a concealed surface, and the retention surface contacts the concealed surface of the vehicle component to prevent movement of the tab out of the aperture.

17. The vehicle structure according to claim 15, wherein
    the retention member includes a ramp surface extending from the retention surface to the first face such that the ramp surface is tapered toward the free end of the tab to guide installation of the tab through the aperture.

18. The vehicle structure according to claim 14, further comprising
    an airbag disposed between the pillar and the vehicle interior trim panel, the retention member engaging the vehicle component to maintain the tab within the aperture during deployment of the airbag.

19. The vehicle structure according to claim 14, wherein
    the tab and the retention member are configured with respect to the aperture such that the tab releases from the aperture without deformation therebetween in a first position and prevented from being withdrawn from the aperture without deformation therebetween in a second position.

20. The vehicle structure according to claim 14, further comprising
    an airbag disposed between the pillar and the vehicle interior trim panel, with the vehicle interior trim panel being configured to pivot relative to the vehicle component to allow deployment of the airbag.

21. The vehicle structure according to claim 20, wherein
    the vehicle interior trim panel is pivotally arranged relative to the vehicle component by the second face contacting the vehicle component during deployment of the airbag.

* * * * *